United States Patent
Palfai et al.

(10) Patent No.: US 8,419,588 B2
(45) Date of Patent: Apr. 16, 2013

(54) LOCKING RING FOR A PLANETARY GEAR SET INCORPORATED INTO A TRANSMISSION MEMBER

(75) Inventors: Balazs Palfai, Fishers, IN (US); Attila Nagy, Fishers, IN (US); Andrew Meyer, Fortville, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 253 days.

(21) Appl. No.: 12/950,553

(22) Filed: Nov. 19, 2010

(65) Prior Publication Data

US 2012/0129641 A1 May 24, 2012

(51) Int. Cl.
*F16H 57/08* (2006.01)

(52) U.S. Cl.
USPC ........................................................ 475/331

(58) Field of Classification Search ................... 475/331, 475/317, 5, 149
See application file for complete search history.

(56) References Cited

U.S. PATENT DOCUMENTS

| | | | | |
|---|---|---|---|---|
| 5,702,320 A | * | 12/1997 | Brassai et al. | 475/159 |
| 6,561,945 B2 | * | 5/2003 | Shattuck et al. | 475/331 |
| 7,195,578 B2 | * | 3/2007 | Dalenberg et al. | 475/331 |
| 7,214,161 B2 | * | 5/2007 | Jinbo | 475/346 |
| 7,534,189 B2 | * | 5/2009 | Inagaki et al. | 475/331 |
| 8,187,141 B2 | * | 5/2012 | Goleski et al. | 475/331 |
| 2003/0167803 A1 | * | 9/2003 | Wilson et al. | 68/12.24 |
| 2006/0250558 A1 | * | 11/2006 | Burns et al. | 349/139 |
| 2008/0167157 A1 | * | 7/2008 | Creighton et al. | 475/269 |
| 2010/0304918 A1 | * | 12/2010 | Burgman et al. | 475/331 |
| 2012/0129642 A1 | * | 5/2012 | Palfai et al. | 475/149 |

* cited by examiner

*Primary Examiner* — Roger Pang
(74) *Attorney, Agent, or Firm* — Cantor Colburn LLP

(57) ABSTRACT

A planetary gear set includes a carrier assembly. The carrier assembly includes a carrier member having a carrier member body that defines an inner carrier portion. The carrier member body includes a planet gear support surface and a carrier plate support member that extends substantially perpendicularly from the planet gear support surface. The carrier plate support member includes an edge portion having a mounting element. A carrier plate is arranged, at least in part, within the inner carrier portion at the edge portion. The carrier plate includes a carrier plate body having first and second opposing surfaces that define an outer edge section. The outer edge section includes a mounting member. A locking member is arranged in the mounting element and the mounting member to operatively coupling the carrier member and the carrier plate.

18 Claims, 4 Drawing Sheets

LOCKING RING FOR A PLANETARY GEAR SET INCORPORATED INTO A TRANSMISSION MEMBER

BACKGROUND OF THE INVENTION

Exemplary embodiments pertain to the art of planetary gear sets and, more particularly, to a locking ring for a planetary gear set incorporated into a transmission member.

Engineers are exploring various methods to save weight and space in the design and construction of motor vehicles. In addition to weight and space concerns, engineers are investigating various propulsion systems to replace and/or augment fossil fuels. One current area of investigation is the use of electric powered vehicles. In an electric powered vehicle, space and weight are of concern. Lowering component weight will lead to an enhanced operational envelope for electric motors. That is, the less weight the electric motor must move, the more energy can be devoted to moving the vehicle and prolonging operational time.

Drive train components such as motors, transmissions, differentials and the like typically include large housings that support multiple gears, bearings and shafts which require a great deal of power to operate. Conventional drive train components include a multitude of mechanical fasteners that are employed to join various moving components. The mechanical fasteners contribute to an overall weight of the moving components and thereby contribute to energy losses in the drive train.

BRIEF DESCRIPTION OF THE INVENTION

Disclosed is a planetary gear set including a ring gear having an inner diametric surface that defines an inner ring gear portion. The inner diametric surface includes a plurality of gear teeth. A carrier assembly is arranged within the inner ring gear portion. The carrier assembly includes a carrier member having a carrier member body that defines an inner carrier portion. The carrier member body includes a planet gear support surface and a carrier plate support member that extends substantially perpendicularly from the planet gear support surface. The carrier plate support member includes an edge portion having a mounting element. A carrier plate is arranged, at least in part, within the inner carrier portion at the edge portion. The carrier plate includes a carrier plate body having first and second opposing surfaces that define an outer edge section. The outer edge section includes a mounting member. A locking member is arranged in the mounting element and the mounting member to operatively coupling the carrier member and the carrier plate.

Also disclosed is a transmission member including a stator, and a rotor mounted relative to the stator. The rotor includes a hub portion and a plurality of rotor laminations configured and disposed to rotate relative to the stator. A planetary gear set is operatively coupled to the hub portion of the rotor. The planetary gear set includes a ring gear having an inner diametric surface that defines an inner ring gear portion. The inner diametric surface includes a plurality of gear teeth. A carrier assembly is arranged within the inner ring gear portion. The carrier assembly includes a carrier member having a carrier member body that defines an inner carrier portion. The carrier member body includes a planet gear support surface and a carrier plate support member that extends substantially perpendicularly from the planet gear support surface. The carrier plate support member includes an edge portion having a mounting element. A carrier plate is arranged, at least in part, within the inner carrier portion at the edge portion. The carrier plate including a carrier plate body having first and second opposing surfaces that define an outer edge section. The outer edge section includes a mounting member. A locking member is arranged in the mounting element and the mounting member to operatively coupling the carrier member and the carrier plate.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
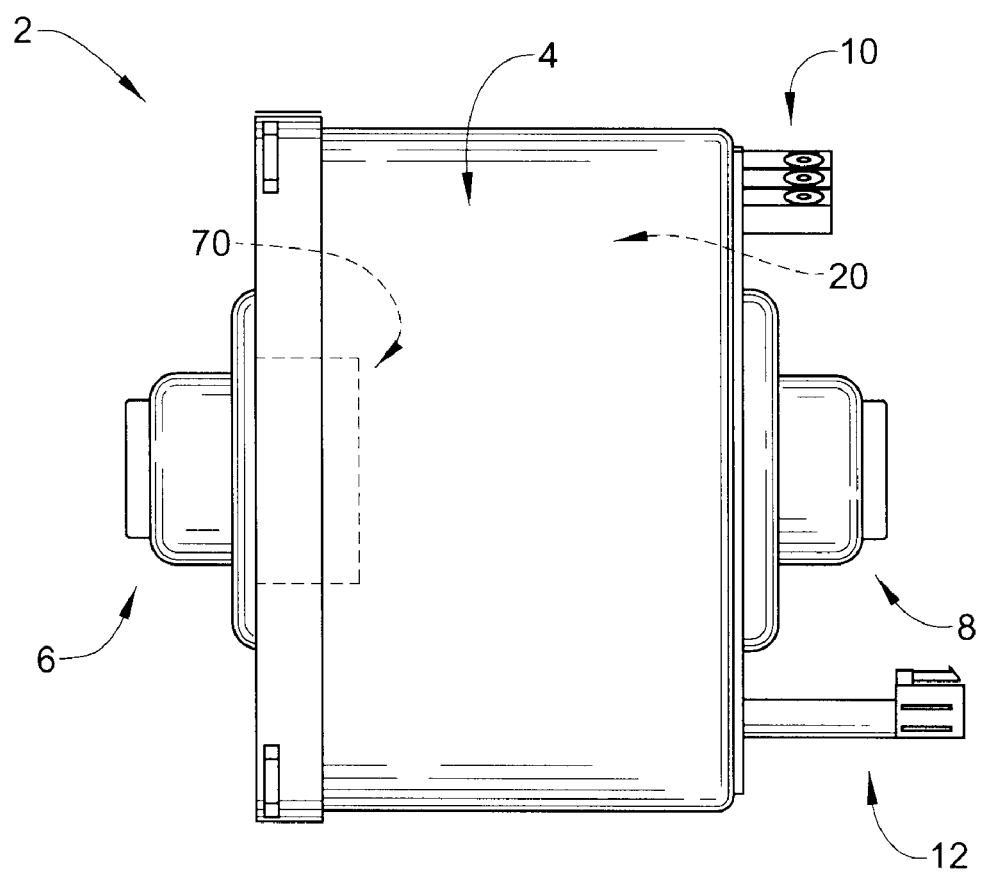
FIG. 1 depicts a perspective view of a transmission member having a planetary gear set provided with a locking ring in accordance with an exemplary embodiment.

With reference to FIG. 1, a transmission member constructed in accordance with an exemplary embodiment is indicated generally at 2. Transmission member 2 includes a housing 4 having a first output hub 6 and a second output hub 8. First and second output hubs 6 and 8 provide an interface to corresponding first and second drive wheels (not shown). Transmission member 2 is also shown to include electric power terminals 10 and a signal or sensor connector 12. As will be discussed more fully below, power terminals 10 and sensor connector 12 are electrically connected to an electric motor 20 arranged within housing 4.

Figure 2:
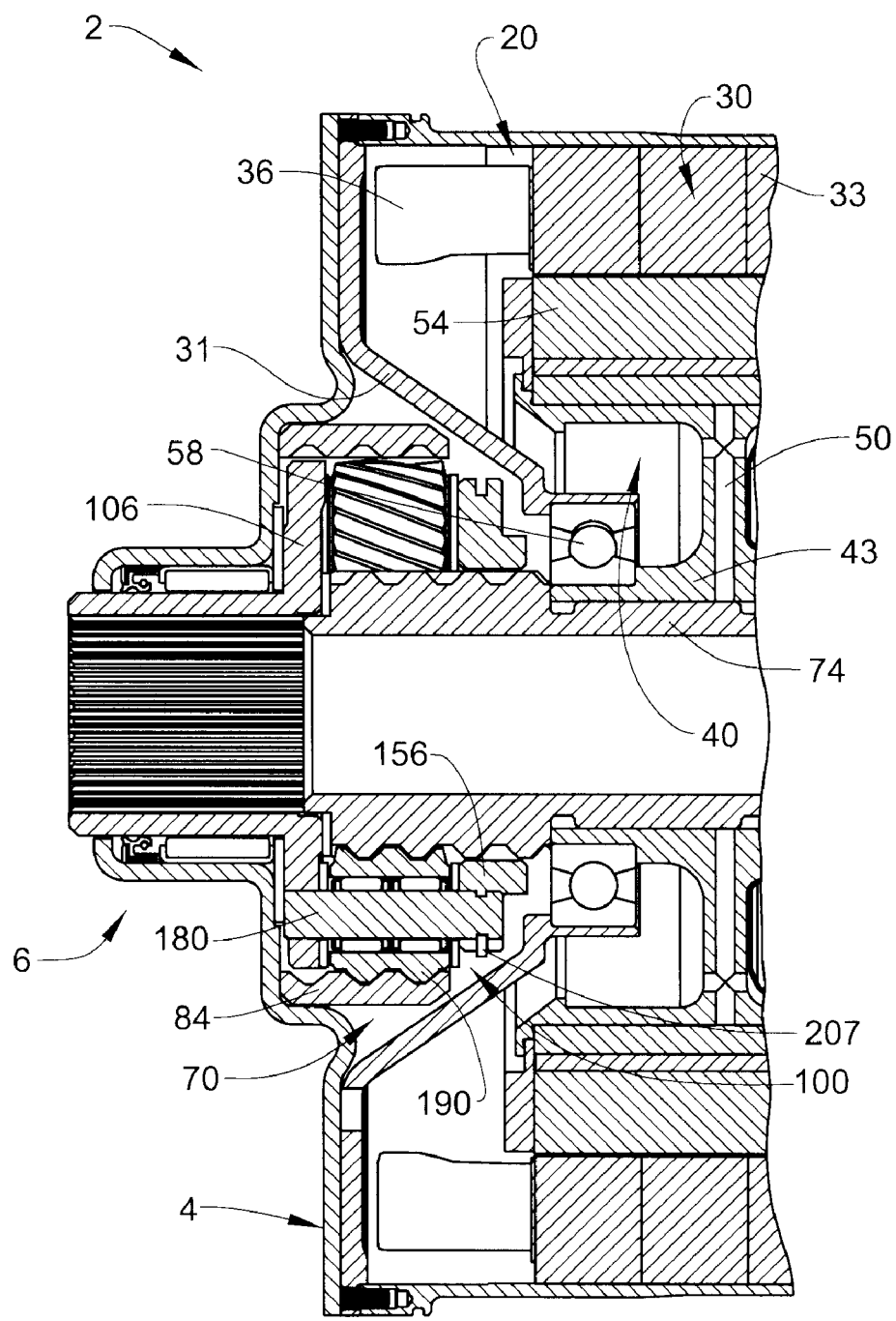
FIG. 2 depicts a partial cross-sectional view of the transmission member of FIG. 1 in accordance with an exemplary embodiment.

As best shown in FIG. 2, electric motor 20 includes a stator assembly 30 having a stator housing 31. A stator core 33 is arranged within stator housing 31. Stator core 33 is surrounded by a plurality of stator windings 36. Electric motor 20 also includes a rotor assembly 40 that is rotatably mounted relative to stator assembly 30. Rotor assembly 40 includes a hub portion 43. Hub portion 43 includes a lamination support element 50 that supports a plurality of rotor laminations 54. Hub portion 43 is rotatably supported relative to stator housing 31 by first and second bearings, one of which is shown at 58. As will be discussed more fully below, hub portion 43 is operatively connected to a planetary gear set 70 through a shaft 74.

Figure 3:
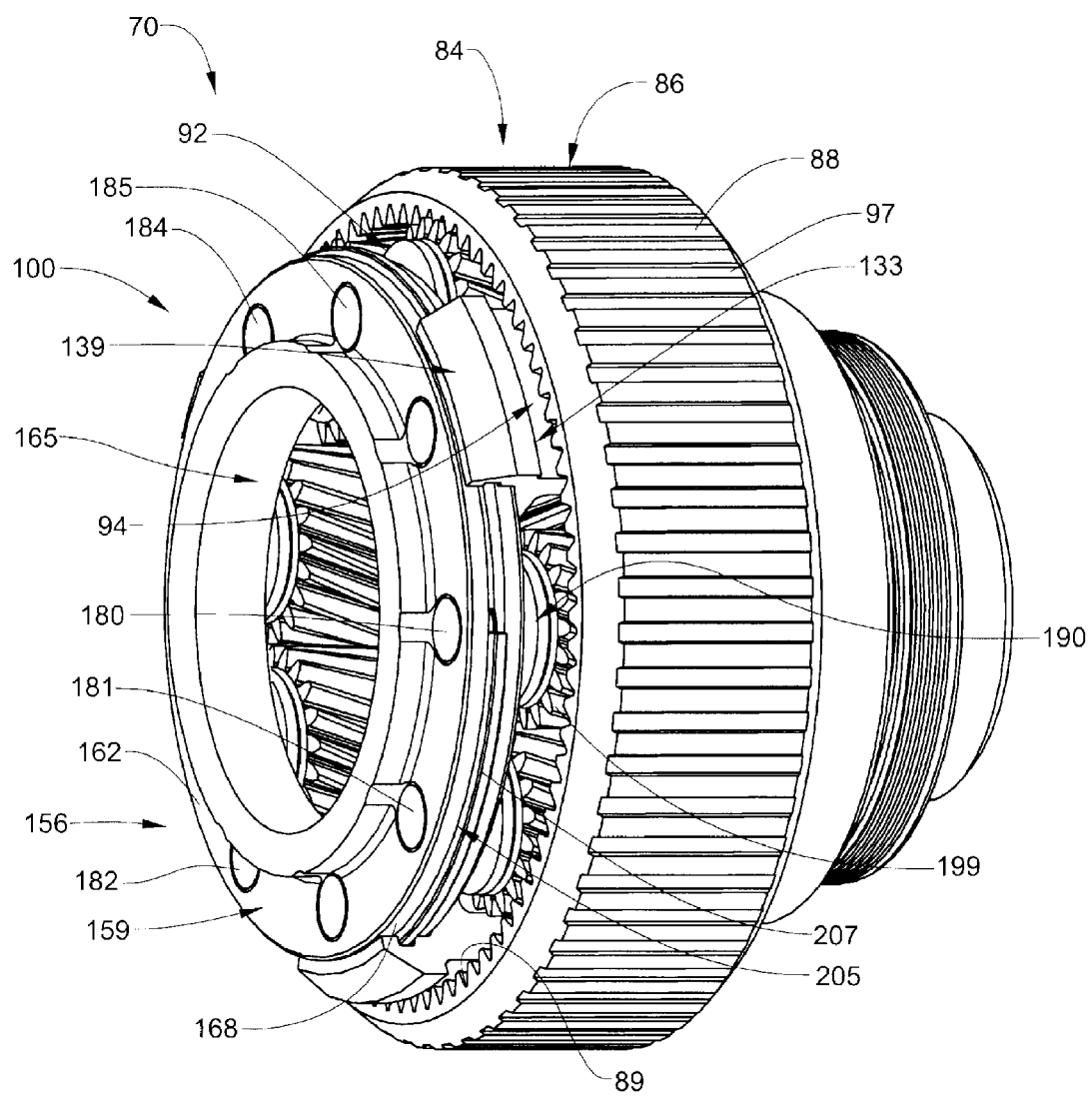
FIG. 3 is a perspective view of a planetary gear set including a carrier assembly in accordance with an exemplary embodiment.

Referencing FIG. 3, planetary gear set 70 includes a ring gear 84 having a ring gear body 86. Ring gear body 86 includes an outer diametric surface 88 and an inner diametric surface 89 that defines an inner ring gear portion 92. In the exemplary embodiment shown, inner diametric surface 89 includes a plurality of ring gear teeth, one of which is shown at 94 and outer diametric surface 88 includes a plurality of recessed portions, one of which is indicated at 97, that define raised areas that facilitate an interlocking fit or press fit between ring gear body 86 and housing 4. Of course, it should be understood that other features such as keyways or the like could also be employed. Planetary gear set 70 is further shown to include a carrier assembly 100 arranged within inner ring gear portion 92.

In accordance with an exemplary embodiment, carrier assembly 100 includes a carrier member 106 having a carrier member body 108 that defines an inner carrier portion 110. Carrier member body 108 includes a base portion 112 having a planet gear support surface 115 and an opposing hub support surface 117 that define a central opening 118. Central opening 118 is coupled to a geared output hub 123. Carrier member 106 is also shown to include a carrier plate support member 130. Carrier plate support member 130 includes a plurality of carrier plate support elements 133-135 that extend substantially perpendicularly from base portion 112. As each carrier plate support element 133-135 is substantially similar, a detailed description will follow referencing carrier plate support element 133 with an understanding that the remaining carrier plate support elements 134 and 135 are similarly constructed. Carrier plate support element 133 includes an edge portion 139 having a circumferential surface 143. Circumferential surface 143 includes a mounting element 146 the purpose of which will become more fully evident below. In the exemplary embodiment shown, mounting element 146 constitutes a groove element 148. At this point it should be understood that circumferential surface 143 defines a portion of an overall circumference of carrier plate support member 130. Also, while shown as being formed from three distinct carrier plate support elements, it should be understood that carrier plate support member 130 could also be formed having a continuous outer surface provided with a plurality of openings.

Carrier assembly 100 is further shown to include a carrier plate 156 which, as will be discussed more fully below, is joined to carrier member 106. Carrier plate 156 includes a carrier plate body 159 having a first surface 162 and a second, opposing surface 163 that define a central opening 165. Central opening 165 is configured to receive shaft 74. Carrier plate 156 is further shown to include an outer diametric edge section 168 that includes a mounting member 173. In the exemplary embodiment shown, mounting member 173 constitutes a groove member 175. As will be discussed more fully below, carrier plate 156 is configured to nest within inner carrier portion 110 at edge portion 139 such that mounting member 173 registers or aligns with mounting element 146.

Figure 4:
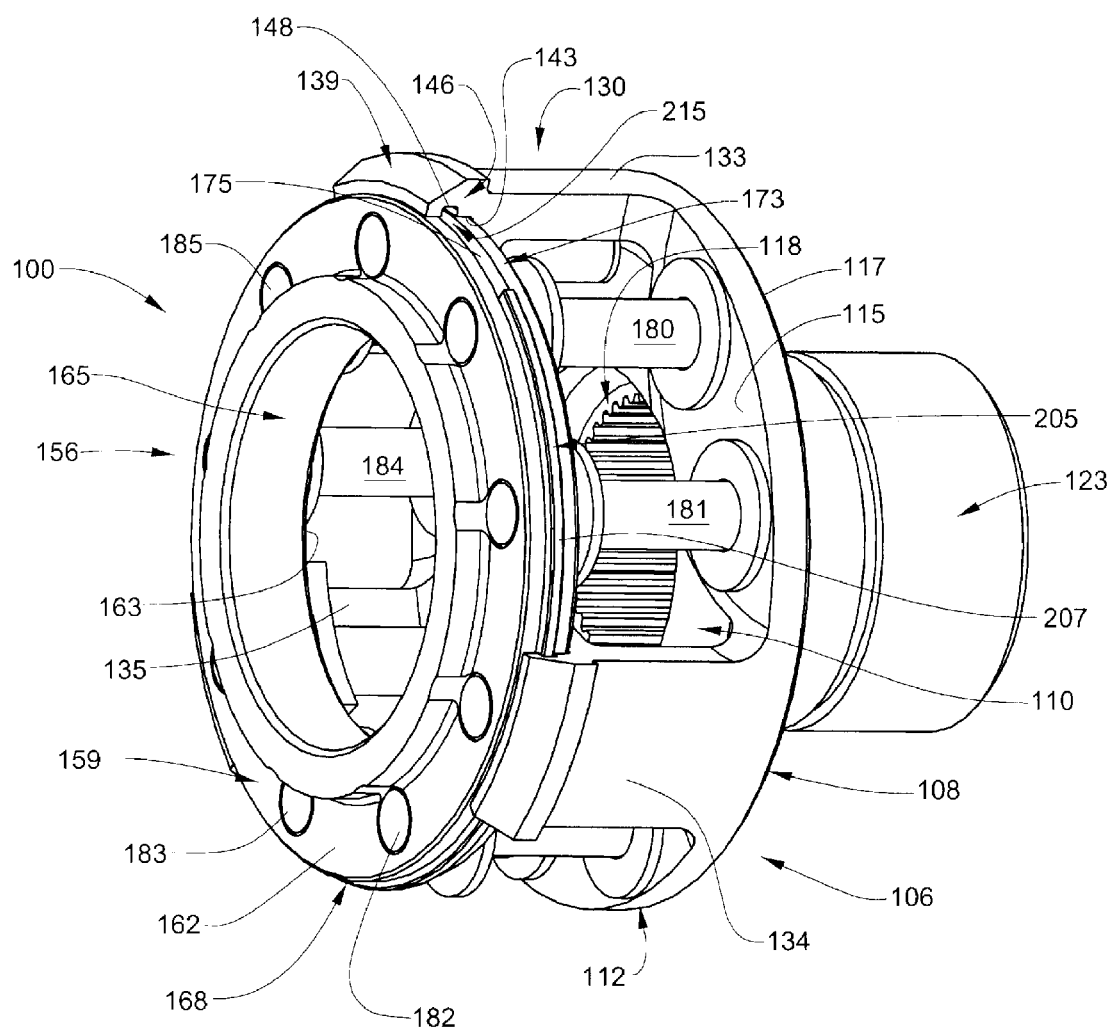
FIG. 4 is a perspective view of the carrier assembly of FIG. 4.

As further shown in FIG. 4, carrier plate 156 is joined to carrier member 106 through a plurality of planet gear support pins 180-185. Planet gear support pins 180-185 extend through carrier plate body 159 and mounted in corresponding planet pin receiving members (not separately labeled) formed in base portion 112. Each planet gear support pin 180-185 rotatably supports a corresponding planet gear, one of which is indicated at 190 (FIG. 3). Each planet gear 190 includes a plurality of planet gear teeth 199 that operatively engage with ring gear teeth 94 and additional gear teeth (not separately labeled) formed on shaft 74.

In order to further link carrier member 106 with carrier plate 156, carrier assembly 100 includes a locking member 205. Locking member 205 takes the form of a locking ring 207 that is passed through mounting element 146 and mounting member 173. More specifically, when carrier plate 156 is in position relative to carrier member 156, groove element 148 aligns with groove member 175 forming a slot 215. Locking ring 207 is passed into slot 215 and worked around outer diametric edge section 168. In this manner, locking ring 207 not only joins carrier plate 156 and carrier member 106 but also establishes a desired alignment to ensure proper tracking of planet gears 195, carrier member 106 and ring gear 84.

With this arrangement, electrical energy passing through stator windings 36 creates an electro-magnetic field that imparts a rotational force to rotor assembly 40. As rotor assembly 40 spins, shaft 74 rotates. The rotation of shaft 74 is passed through planet gears 94 to ring gear 84 creating a rotation of carrier assembly 100. The rotation of carrier assembly 100 leads to a rotation of output hub 123 and is passed on to, for example, vehicle drive wheels. The drive wheels can be positioned at a front portion of a vehicle (front wheel drive), at a rear portion of a vehicle (rear wheel drive), or at both the front and rear portion of a vehicle (all wheel drive). At this point it should be understood that the exemplary embodiments provide a transmission member having an integrated electric motor. The electric motor, in turn, includes an integrated planetary gear set. By incorporating the planetary gear set into the electric motor, an overall size of the transmission member is greatly reduced. The reduction in size leads to a reduction in weight that creates various efficiency enhancements when the transmission member is incorporated into a vehicle. In addition to the reduction in size, integration of the electric motor into the transmission eliminates the need for separate electric motor and transmission assemblies that would require separate installation, maintenance, inventory tracking and the like.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A planetary gear set comprising:
   a ring gear having an inner diametric surface that defines an inner ring gear portion, the inner diametric surface including a plurality of ring gear teeth; and
   a carrier assembly arranged within the inner ring gear portion, the carrier assembly including:
   a carrier member having a carrier member body that defines an inner carrier portion, the carrier member body including a planet gear support surface and a carrier plate support member that extends substantially perpendicularly from the planet gear support surface, the carrier plate support member including an edge portion having a mounting element;
   a carrier plate arranged, at least in part, within the inner carrier portion at the edge portion, the carrier plate including a carrier plate body having first and second opposing surfaces that define an outer edge section, the outer edge section including a mounting member; and
   a locking member arranged in the mounting element and the mounting member to operatively coupling the carrier member and the carrier plate.

2. The planetary gear set according to claim 1, further comprising: at least one planet gear support pin extending between the planet gear support surface of the carrier member and one of the first and second opposing surfaces of the carrier plate.

3. The planetary gear set according to claim 2, further comprising: at least one planet gear mounted to the at least one planet gear support pin, the at least one planet gear including a plurality of planet gear teeth configured to operatively engage with the plurality of ring gear teeth.

4. The planetary gear set according to claim 1, wherein the carrier plate support member includes at least three carrier plate support elements, each of the at least three carrier plate support elements including a segment of the edge portion, the mounting member being arrange on the segment of the edge portion.

5. The planetary gear set according to claim 1, wherein the carrier member body includes a hub support surface arranged opposite to the planet gear support surface.

6. The planetary gear set according to claim 5, further comprising: an output hub provided on the hub support surface of the carrier member.

7. The planetary gear set according to claim 1, wherein the outer edge section aligns with the edge portion of the carrier plate support member.

8. The planetary gear set according to claim 7, wherein the mounting member comprises a groove member formed in the outer edge section.

9. The planetary gear set according to claim 8, wherein the mounting element defines a groove element that registers with the groove member forming a slot.

10. The planetary gear set according to claim 9, wherein the locking member comprises a locking ring arranged within the slot formed by the groove member and the groove element.

11. A transmission member comprising:
a stator;
a rotor mounted relative to the stator, the rotor including a hub portion and a plurality of rotor laminations configured and disposed to rotate relative to the stator; and
a planetary gear set operatively coupled to the hub portion of the rotor, the planetary gear set including:
a ring gear having an inner diametric surface that defines an inner ring gear portion, the inner diametric surface including a plurality of ring gear teeth; and
a carrier assembly arranged within the inner ring gear portion, the carrier assembly including:
a carrier member having a carrier member body that defines an inner carrier portion, the carrier member body including a planet gear support surface and a carrier plate support member that extends substantially perpendicularly from the planet gear support surface, the carrier plate support member including an edge portion having a mounting element;
a carrier plate arranged, at least in part, within the inner carrier portion at the edge portion, the carrier plate including a carrier plate body having first and second opposing surfaces that define an outer edge section, the outer edge section including a mounting member; and
a locking member arranged in the mounting element and the mounting member to operatively coupling the carrier member and the carrier plate.

12. The transmission member according to claim 11, wherein the planetary gear set further comprises: at least one planet gear support pin extending between the planet gear support surface of the carrier member and one of the first and second opposing surfaces of the carrier plate.

13. The transmission member according to claim 12, wherein the planetary gear set further comprises: at least one planet gear mounted to the at least one planet gear support pin.

14. The transmission member according to claim 11, wherein the carrier plate support member includes at least three carrier plate support elements, each of the at least three carrier plate support elements including a segment of the edge portion, the mounting member being arrange on the segment of the edge portion.

15. The transmission member according to claim 11, wherein the outer edge section defines a circumferential surface section that nests within the circumferential surface defined by the carrier plate support member.

16. The transmission member set according to claim 15, wherein the mounting member comprises a groove member formed in the circumferential surface.

17. The transmission member according to claim 16, wherein the mounting element defines a groove element that registers with the groove member forming a slot.

18. The transmission member according to claim 17, wherein the locking member comprises a locking ring arranged within the slot formed by the groove member and the groove element.

* * * * *